United States Patent [19]
Lopez et al.

[11] Patent Number: 6,138,760
[45] Date of Patent: Oct. 31, 2000

[54] PRE-TREATMENT METHODS FOR POLYMER-CONTAINING FLUIDS

[75] Inventors: Enrique Lopez, Midland; Robert M. Tjon-Joe-Pin, Houston, both of Tex.

[73] Assignee: BJ Services Company, Houston, Tex.

[21] Appl. No.: 09/207,118

[22] Filed: Dec. 7, 1998

[51] Int. Cl.[7] .......................... E21B 37/07; E21B 43/26
[52] U.S. Cl. .................. 166/300; 166/308; 166/312
[58] Field of Search .................... 166/279, 311, 166/312, 307, 308

[56] References Cited

U.S. PATENT DOCUMENTS

| | | | |
|---|---|---|---|
| 2,602,778 | 7/1952 | Snyder et al. | 507/203 |
| 2,681,704 | 7/1954 | Menaul | 166/281 |
| 2,801,218 | 7/1957 | Menaul | 507/201 |
| 3,044,550 | 7/1962 | Eilers | 166/281 |
| 3,684,710 | 8/1972 | Cayle et al. | 507/201 |
| 3,710,865 | 1/1973 | Kiel | 166/308 |
| 3,760,375 | 9/1973 | Irwin et al. | 707/3 |
| 3,803,660 | 4/1974 | Jividen et al. | 15/88.2 |
| 4,119,546 | 10/1978 | Wernau | 507/213 |
| 4,157,116 | 6/1979 | Coulter | 166/280 |
| 4,160,483 | 7/1979 | Thomas et al. | 166/307 |
| 4,215,001 | 7/1980 | Elphingstone et al. | 507/277 |
| 4,313,834 | 2/1982 | Harris | 507/215 |
| 4,317,735 | 3/1982 | Crowe | 507/213 |
| 4,324,668 | 4/1982 | Harris | 507/215 |
| 4,342,866 | 8/1982 | Kang et al. | 536/119 |
| 4,343,363 | 8/1982 | Norton et al. | 166/281 |
| 4,410,625 | 10/1983 | Cadmus | 435/42 |
| 4,426,296 | 1/1984 | Crowe | 507/260 |
| 4,442,897 | 4/1984 | Crowell | 166/280 |
| 4,479,543 | 10/1984 | Kalfayan et al. | 166/300 |
| 4,502,967 | 3/1985 | Conway | 507/203 |
| 4,514,309 | 4/1985 | Wadhwa | 507/211 |
| 4,566,979 | 1/1986 | Githens | 507/203 |
| 4,609,475 | 9/1986 | Hanlon et al. | 507/260 |
| 4,665,985 | 5/1987 | Berrod et al. | 166/281 |
| 4,689,160 | 8/1987 | Steenbergen et al. | 507/211 |
| 4,690,891 | 9/1987 | Hou et al. | 435/42 |
| 4,713,449 | 12/1987 | Vanderslice et al. | 536/123 |
| 4,809,783 | 3/1989 | Hollenbeck et al. | 144/307 |
| 4,886,746 | 12/1989 | Cadmus et al. | 435/42 |
| 4,928,763 | 5/1990 | Falk | 166/285 |
| 4,996,153 | 2/1991 | Cadmus et al. | 435/209 |
| 5,032,297 | 7/1991 | Williamson et al. | 507/201 |
| 5,067,566 | 11/1991 | Dawson | 166/308 |
| 5,082,579 | 1/1992 | Dawson | 507/211 |
| 5,103,905 | 4/1992 | Brannon et al. | 166/250.1 |
| 5,126,051 | 6/1992 | Shell et al. | 210/432 |
| 5,145,590 | 9/1992 | Dawson | 507/211 |
| 5,160,643 | 11/1992 | Dawson | 507/268 |
| 5,165,477 | 11/1992 | Shell et al. | 166/291 |
| 5,201,370 | 4/1993 | Tjon-Joe-Pin | 166/300 |
| 5,224,544 | 7/1993 | Tjon-Joe-Pin et al. | 166/295 |
| 5,226,479 | 7/1993 | Gupta et al. | 166/300 |
| 5,247,995 | 9/1993 | Tjon-Joe-Pin et al. | 166/312 |
| 5,421,412 | 6/1995 | Kelly et al. | 166/300 |
| 5,439,059 | 8/1995 | Harris et al. | 166/300 |
| 5,441,109 | 8/1995 | Gupta et al. | 166/300 |
| 5,447,197 | 9/1995 | Rae et al. | 166/293 |
| 5,514,309 | 5/1996 | Williamson et al. | 264/37 |
| 5,529,125 | 6/1996 | Di Lullo et al. | 166/307 |
| 5,562,160 | 10/1996 | Brannon et al. | 166/250.1 |
| 5,566,759 | 10/1996 | Tjon-Joe-Pin et al. | 166/300 |
| 5,604,186 | 2/1997 | Hunt et al. | 507/204 |

FOREIGN PATENT DOCUMENTS

| | | |
|---|---|---|
| 0030393 | 6/1983 | European Pat. Off. . |
| WO 91/18974 | 12/1991 | WIPO . |
| WO 94/01654 | 1/1994 | WIPO . |

OTHER PUBLICATIONS

Beall et al., "Evaluation of a New Technique for Removing Horizontal Wellbore Damage Attributable to Drill–in Filter Cake," *SPE 36429*, Oct. 6–9, 1996.

Borman, "Bacteria that Flourish Above 100°C Could Benefit Industrial Procesing," *C & EN—Science/Technology*, 31–34 Nov. 4, 1991.

Brannon and Tjon–Joe–Pin, "Application of Polymeric Damage Removal Treatment Results in Multi–Fold Well Productivity Improvement: A Case Study," *SPE 29822*, 491–501, Mar. 11–14, 1995.

Brannon and Tjon–Joe–Pin, "Biotechnological Breakthrough Improves Performance of Moderate to High–Temperature Fracturing Applications", *SPE 28513*, 515–530, Sep. 25–28, 1994.

Burnett, "Using a Physical Wellbore Model to Study Formation Damage Problems in Well Completions," *SPE 27393*, 495–504, Feb. 7–10, 1994.

Cadmus and Slodki, "Bacterial Degradation of Xanthan Gum," *Industrial Polysaccharides: Genetic Engineering, Structure/Property Relations and Applications edited by M. Yalpani*, 101–107, 1987.

Cadmus and Slodki, "Enzymic Breakage of Xanthan Gum Solution Viscosity in the Presence of Salts," *Developments in Industrial Microbiology*, 26:281–289, Aug. 11–17, 1984.

Hodge et al., "Evaluation and Selection of Drill–in Fluid Candidates to Minimize Formation Damage," *SPE 31082*, 101–105, Feb. 14–15, 1996.

Jeanes, "Applications of Extracellular Microbial Polysaccharide–Polyelectrolytes: Review of Literature, Including Patents," *J. Polymer Sci.: Symposium No. 45*, 209–227, 1974.

(List continued on next page.)

*Primary Examiner*—David Bagnell
*Assistant Examiner*—Jennifer R. Dougherty
*Attorney, Agent, or Firm*—O'Keefe, Egan & Peterman, LLP

[57] ABSTRACT

A treatment for wells and/or subterranean formations in which a pre-treatment fluid is introduced prior to a polymer-containing treatment fluid, such as a hydraulic fracturing fluid. The pre-treatment fluid may contain an enzyme and/or oxidative breaker effective to degrade the polymer in the polymer-containing treatment fluid. The enzyme or oxidative breaker of the enzyme pre-treatment fluid enhance degradation of polymer filter cake from the reservoir-side of the filter cake during flow-back of the treatment fluid.

44 Claims, No Drawings

OTHER PUBLICATIONS

Kelly and Brown, "Enzymes From High–Temperature Microorganisms," *Current Opinion in Biotechnology*, 4:188–192, 1993.

LeBlanc, "Limiting, Treating Formation Damage in Horizontal, Extended Reach Wells," *Offshore*, 56–61, Jun. 1996.

McLarty et al., "Overview of Offshore Horizontal Drilling/ Completion Projects in Unconsolidated Sandstones in the Gulf of Mexico," *OTC 7352*, 861–868, May 3–6, 1993.

Ryan et al., "Mud Clean–Up in Horizontal Wells: A Major Joint Industry Study," *SPE 30528*, 801–810, Oct. 22–25, 1995.

Slodki and Cadmus, "Production and Stability of Xanthan Gums; Xanthanases and Their Applicability," *Microbes and Oil Recovery vol. 1, International Bioresources Journal*, 190–199, 1985.

Cadmus et al., "High–Temperature, Salt–Tolerant Xanthanase," *Journal of Industrial Microbiology*, 4:127–133, 1993.

Cadmus et al., "Biodegradation of Xanthan Gum by *Bacillus sp.*," *Applied and Environmental Microbiology*, 5–11, 1982.

Ahlgren, "Characterization of Xanthan Gum Degrading Enzymes from a Heat–stable, Salt–tolerant Bacterial Consortium," in *Microbial Enhancement of Oil Recovery: Recent Advances*, edited by Premuzic and Woodhead; published by Elsevier: Amsterdam, p.55–63, 1993.

Ahlgren, "Enzymatic Hydrolysis of Xanthan Gum at Elevated Temperatures and Salt Concentrations," in *Gas, Oil and Environmental Biotechnology VI*, edited by Srivastava et al., published by Institute of Gas Technology: Des Plaines, p.245–253, 1995.

Ahlgren, "Purification and Characterization of a Pyruvated– Mannose–Specific Xanthan Lyase from Heat–Stable, Salt– Tolerant Bacteria," *Applied and Environmental Microbiology*, 57(9):2523–2528, Sep. 1991.

Ahlgren, "Purification and Properties of a Xanthan Depolymerase from a Heat–Stable Salt–Tolerant Bacterial Consortium," *Journal of Industrial Microbiology*, 12:87–92, 1993.

Foreign Search Report dated Jun. 15, 1998.

U.S. Patent Application Serial No. 08/813,064 entitled "Methods and materials for degrading Xanthan", filed Mar. 7, 1997 (BJSC:176).

PRE-TREATMENT METHODS FOR POLYMER-CONTAINING FLUIDS

BACKGROUND OF THE INVENTION

1. Field of the Invention

This invention relates generally to treatments for wells and/or subterranean formations and, more specifically, to well treatments employing polymer-containing fluids. In particular, this invention relates to introduction of an enzyme and/or oxidative-breaker-containing pre-treatment fluid or pre-flush into a wellbore and/or subterranean formation prior to introduction of a polymer-containing treatment fluid into the well.

2. Description of Related Art

Filter cakes or face plugs may be formed during various procedures performed within a wellbore. Typically, filter cakes are composed of precipitates, such as silicates formed from drilling muds, or residue formed after using polymer-containing gelatable fluids. In such cases the residue may contain polysaccharides.

For example, during hydraulic fracturing, a fluid is typically injected into a wellbore and subterranean formation under relatively high pressure. Once the natural reservoir pressures are exceeded, the fracturing fluid initiates a fracture in the formation which generally continues to grow during pumping. Viscosity of the treatment fluid generally affects the fracture length and width. Increased viscosity is typically obtained by the gelation of suitable polymers, such as polysaccharides. A gel fluid may be accompanied by a propping agent, which results in the placement of the propping agent within the fracture thus produced. The proppant remains in the produced fracture to prevent complete closure of the fracture and to form a conductive channel extending from the wellbore into the formation being treated once the fracture fluid is recovered.

In other cases, polymer-containing gelatable treatment fluids may be employed during drilling, completion, remedial and/or workover operations. During such operations, polymer-containing treatment fluids may be employed to facilitate, for example, drilling, cleanout, solids transport, fluid loss control, etc. For example, polysaccharides may be used to thicken fluids and control fluid loss. Polysaccharides may also be used to support proppants, such as in sand control fluids and completion fluids. Specific examples of polymer-containing treatment fluids include, but are not limited to, drill-in fluids, drilling muds, gravel pack fluids, gelled acid fluids, foamed cleanout fluids, lost circulation pills, etc.

Typically, at the end of fracturing or other wellbore operations which employ polymer-containing treatment fluids, a polymer gel is degraded and the treatment fluids recovered. Recovery of fracturing and other polymer-containing treatment fluids is typically accomplished by reducing the viscosity of the fluid to a low value such that it may flow naturally from the formation under the influence of formation fluids and pressure. This viscosity reduction or conversion is typically referred to as "breaking". Enzymes are commonly employed as breakers due to inherent specificity and the infinite polymer degrading activity of enzymes. The use of enzyme breakers allows the degradation of the polymeric gelling agents in the fluid to proceed in controllable manner to reduce the fracturing fluid viscosity by cleavage of the polymer backbone into fragments which tend to remain soluble in the aqueous-based fluid. Other types of breakers include oxidative breakers.

During procedures employing polymer-containing well treatment fluids, filter cakes are often formed. Filter cakes may form in a variety of ways. For example, when gelled fluids are pumped into a subterranean formation or a wellbore penetrating a subterranean formation, fluid may leak into the formation matrix through the pore spaces of the rock. The pores tend to act as filters, permitting fluid to leak into the rock matrix while filtering out the gel. When this occurs, a layer of filtered gel may deposit on the face of the matrix and plug the formation. Incomplete gel degradation is another example.

When present, filter cakes or gel damage tend to fill pores in the rock matrix and curtail the flow of fluids from or into the formation matrix. A polymeric filter cake may be characterized as a dense mass of polymer deposited on a formation face by dynamic fluid loss to the formation when a polymeric-containing treatment fluid is exposed to the formation face. In the case of hydraulic fracture treatments, such filter cakes may be concentrated within a proppant pack and/or nearby flow channels by fracture width reduction upon fracture closure. In this regard, polymers used as gelling agents in fracture treatments are typically too large to penetrate the rock matrix, therefore, they tend to be concentrated within the fracture. The filter cake may then plug the flow channels, thereby reducing the flow of fluids during production and/or injection. Studies have documented that the polymer concentration within a fracture may be as much as 20-fold the surface gelling agent concentration. Although some polymers may not form filter cakes, the viscosity of these fluids creates damaging conditions analogous to those found with filter cakes. Therefore, the term "filter cake" when used as a generic term in this disclosure may also refer to these conditions.

Polymeric damage in the form of unbroken gel residue or dynamically formed filter cake may significantly reduce well productivity and/or injectivity. Gel residue damage may be characterized as the blockage of pore throats by an unbroken viscous gel having limited mobility, or by insoluble polymer fragments. For example, in the case of induced fractures, the degree of damage is typically proportional to the amount of fracture pore volume occupied by gel residue.

During polymer-containing well treatments, such as hydraulic fracturing treatments, breakers are typically added to the polymer treatment fluid to reduce the viscosity of the polymer treatment fluid so that the polymeric materials may be recovered. Such recovery tends to reduce polymeric damage by, for example, minimization of the amount of gel residue remaining in a fracture after load recovery. However, concentration of breaker which may be employed in a polymeric-containing fluid such as a fracturing fluid must typically be limited due to the effect of the breaker on the viscosity of the fluid during treatment. Consequently, complete or near complete degradation of a filter cake and/or unbroken gel residue may not be possible. Furthermore, during recovery of a polymer-containing treatment fluid from a subterranean formation, reservoir fluids (such as oil, gas or water) may displace portions of the treatment fluid containing breaker while leaving behind filter cake and/or undegraded gel residue. Such filter cake and/or unbroken gel residue then tends to interfere with conductivity of the subterranean formation.

In the case of well treatment fluids which do not employ breakers, the removal of filter cake and/or unbroken gel residue is typically not possible without the performance of a follow-up treatment employing a polymer degrading material such as an enzyme and/or oxidated breaker. However, the effectiveness of such treatments may be limited by accessibility of the filter cake and/or unbroken gel residue damage to an enzyme or oxidated breaker treatment.

Because such polymeric damage tends to plug the formation, such remedial filter cake removal treatments may tend to contact and/or enter the subterranean formation at only selected locations, bypassing other areas of damage.

SUMMARY OF THE INVENTION

The disclosed method provides, among other things, a pre-frac enzyme breaker treatment to enhance degradation of filter cakes and polymer gel residues. In one application fracture conductivity is enhanced by allowing maximization of enzyme breaker action while at the same time maintaining fracture fluid integrity by minimizing excess breaker concentration in a polymer fracture fluid. Benefits of the disclosed method are achieved by virtue of, among other things, contacting polymer-based formation damage (such as the filter cake and/or gel residue) on the reservoir side of the formation damage. In the case of hydraulic fracturing applications, benefits of the disclosed method may include, among other things, sweeping the fracture with a concentrated breaker solution upon flow back of the treatment fluids. Advantageously, the disclosed method may be employed in both gas and oil wells, and in dry or water-saturated environments. The disclosed method may also be employed in other types of wells, such as coalbed methane wells, geothermal wells, water wells, etc.

In one respect, disclosed is a well treatment method which includes introducing a pre-treatment fluid into the well, the pre-treatment fluid including at least one enzyme breaker, at least one oxidative breaker, or a mixture thereof; and introducing a polymer-containing treatment fluid including at least one polymer into the well; wherein the enzyme or oxidative breaker may be effective to degrade the polymer within the polymer-containing treatment fluid. The polymer-containing treatment fluid may be a gelatable fluid including an aqueous fluid and at least one hydratable polymer. The gelatable fluid may further include at least one crosslinking agent effective to cross-link the hydratable polymer. The hydratable polymer may be a polysaccharide. The polysaccharide may be at least one of guar, derivatized guar, cellulose, derivatized cellulose, starch, derivatized starch, xanthan, derivatized xanthan, or a mixture thereof. The polymer-containing treatment fluid may be a gelatable fracturing fluid, gelatable acidizing fluid, or a mixture thereof. The enzyme pre-treatment fluid may further include a polymer substrate. The polymer-containing treatment fluid may further include at least one enzyme, oxidative breaker, or mixture thereof that is effective to degrade the polymer within the polymer-containing treatment fluid. The method may further include introducing a spacer fluid into the subterranean formation after introducing the pre-treatment fluid and before introducing the polymer-containing treatment fluid. The pre-treatment fluid may further include an energizing phase. Among other things, the oxidative breaker may include at least one of ammonium persulfate, encapsulated ammonium persulfate, potassium persulfate, encapsulated potassium persulfate, inorganic peroxides, encapsulated inorganic peroxide, organic peroxides, encapsulated organic peroxide, sodium perborate, encapsulated sodium perborate, or a mixture thereof. In one embodiment, the pre-treatment fluid may include an encapsulated oxidative breaker, for example, encapsulated ammonium persulfate, encapsulated potassium persulfate, encapsulated inorganic peroxide, encapsulated organic peroxide, encapsulated sodium perborate, or a mixture thereof. In another embodiment the pre-treatment fluid may include a mixture of at least one oxidative breaker and at least one enzyme. For example the polymer may include guar, derivatized guar or a mixture thereof, and wherein the pre-treatment fluid may include ammonium persulfate oxidative breaker and guar specific enzyme.

In another respect, disclosed is method of treating a subterranean formation, including introducing a pre-treatment fluid into the subterranean formation, the pre-treatment fluid including at least one enzyme breaker, at least one oxidative breaker, or a mixture thereof; introducing a polymer-containing treatment fluid including at least one polymer into the subterranean formation; and removing fluid from the subterranean formation; wherein the enzyme or oxidative breaker is effective to degrade the polymer within the polymer-containing treatment fluid. In this regard fluid removed from the subterranean formation may include at least a portion of the introduced fluids, natural formation fluids, or a mixture thereof. The pre-treatment fluid may include at least one enzyme. The polymer-containing treatment fluid may be a gelatable fluid including an aqueous fluid and at least one hydratable polymer. The gelatable fluid may further include at least one crosslinking agent effective to cross-link the hydratable polymer. The hydratable polymer may be a polysaccharide and the enzyme may be a hydrolase. The polysaccharide may be at least one of guar, derivatized guar, cellulose, derivatized cellulose, starch, derivatized starch, xanthan, derivatized xanthan, or a mixture thereof; and wherein the enzyme may be at least one of hemicellulase, cellulase, amylase and xanthanase, or a mixture thereof. The polysaccharide may be guar, derivatized guar, or a mixture thereof; and wherein the enzyme may be hemicellulase. The polymer-containing treatment fluid may be a gelatable fracturing fluid, gelatable acidizing fluid, or a mixture thereof. The polymer-containing treatment fluid may be a gelatable fracturing fluid. The enzyme pre-treatment fluid may further include a polymer substrate. In one embodiment, the enzyme pre-treatment fluid may contain from about 5 pounds of polymer substrate per thousand gallons of the enzyme pre-treatment fluid to about 100 pounds of polymer substrate per thousand gallons of the enzyme pre-treatment fluid. The polymer-containing treatment fluid may further include at least one enzyme effective to degrade the polymer within the polymer-containing treatment fluid. The method may further include introducing a spacer fluid into the subterranean formation after introducing the enzyme pre-treatment fluid and before introducing the polymer-containing treatment fluid. The enzyme pre-treatment fluid may further include an energizing phase.

In yet another respect, disclosed is a method of treating a subterranean formation, including introducing an enzyme pre-treatment fluid into the subterranean formation, the enzyme treatment including an aqueous fluid and at least one enzyme; introducing a polymer-containing treatment fluid into the subterranean formation, the polymer-containing treatment fluid including an aqueous fluid and at least one polymer into the subterranean formation; and removing fluid from the subterranean formation; wherein the polymer-containing treatment fluid forms a filter cake within the subterranean formation and wherein the enzyme is effective to degrade the filter cake as the fluid may be removed from the subterranean formation. Fluid removed from the formation include at least one of introduced pretreatment fluid, introduced treatment fluid, natural formation fluid, or any combination thereof. In one embodiment, the filter cake forms on a face of the subterranean formation and has a reservoir side and a wellbore side; and the enzyme of the enzyme pre-treatment fluid contacts the reservoir side of the filter cake to degrade the filter cake as fluid is removed from the subterranean formation. The polymer-containing treatment fluid may be a gelatable fluid including an aqueous fluid and at least one hydratable polymer. The gelatable fluid may further include at least one crosslinking agent effective to crosslink the hydratable polymer. The hydratable polymer may be a polysaccharide and the enzyme may be a hydrolase. The polysaccharide may be at least one of guar, derivatized guar, cellulose, derivatized cellulose, starch, derivatized starch, xanthan, derivatized xanthan, or a mixture thereof; and wherein the enzyme may be at least one of hydrolase, or a mixture thereof. The polysaccharide may be guar, derivatized guar, or a mixture thereof; and wherein the enzyme may be hydrolase. The polymer-containing treatment fluid may be a gelatable fracturing fluid, gelatable acidizing fluid, or a mixture thereof. In one embodiment, the polymer-containing treatment fluid may be a gelatable fracturing fluid including a proppant, and a fracture may be induced in the subterranean formation during the step of introducing the polymer-containing treatment fluid into the subterranean formation so that proppant is deposited in the fracture to maintain the fracture. In this embodiment, the enzyme of the enzyme pre-treatment fluid enters the fracture from the subterranean formation as the fluid is removed from the subterranean formation. The enzyme pre-treatment fluid may further include a polymer substrate. The polymer-containing treatment fluid may further include at least one enzyme effective to degrade the polymer within the polymer-containing treatment fluid. The method may further include introducing a spacer fluid into the subterranean formation after introducing the enzyme pre-treatment fluid and before introducing the polymer-containing treatment fluid. The enzyme pre-treatment fluid may further include an energizing phase. The energizing phase may be carbon dioxide, nitrogen, or a mixture thereof. The volume of the enzyme pre-treatment fluid may be from about 5% to about 50% of a volume of the polymer-containing treatment fluid.

DESCRIPTION OF ILLUSTRATIVE EMBODIMENTS

In embodiments of the disclosed method, an enzyme and/or oxidative breaker-containing pre-flush or pre-treatment fluid is introduced into a wellbore and/or subterranean formation prior to introduction of a polymer-containing treatment fluid. As used herein, the term "introducing" means pumping, injecting, pouring, releasing, displacing, spotting, circulating or otherwise placing a fluid or material within a well, wellbore, or subterranean formation using any suitable manner know in the art. Surprisingly, introduction of such an enzyme pre-treatment fluid prior to a polymer-containing treatment fluid enhances degradation of polymeric damage (such as filter cake and/or unbroken gel residue) formed by a polymer-containing treatment fluid by virtue of the placement of the material of the enzyme pre-treatment on and/or into the subterranean formation. When so employed, placement of enzymes on the reservoir or formation side of a subsequently-formed filter cake advantageously allows degradation of a filter cake and/or unbroken gel residue from the reservoir side, thus facilitating more complete degradation and removal of such filter cakes and/or gel residues. It will be understood with benefit of the present disclosure that "removal" of such filter cakes and/or gel residues is typically accomplished in conjunction with recovery of treatment fluids, such as by natural flow back, artificial lift, swabbing, energized flow back, jetting, etc. However, it will also be understood that benefits of the disclosed method may be realized without such recovery or flow back of treatment fluids. Furthermore, in some cases, removal may be accomplished by displacement of degraded polymeric materials into the formation by, for example, injection of any fluid suitable for displacement.

Placement of enzyme treatment fluid into or on the subterranean formation prior to introduction of a polymer-containing treating fluid also provides increased degradation or breaker action, while at the same time maintaining integrity of a polymer treatment fluid by requiring no additional internal breaker within the polymer-containing treatment fluid. This results in more effective degradation of the filter cake and/or gel residue without increasing the concentration of enzyme breaker in the polymer-containing treatment fluid. Thus, as fluid is recovered from the formation, enzyme-enriched fluid tends to flow from the reservoir or formation face into the wellbore, sweeping the deposited filter cake and/or gel residue as pressure is relieved with the recovery of the polymer-containing treatment fluid. Advantageously, production of enzyme-enriched fluid from the formation supplements any internal enzyme breaker contained within the polymer-containing treating fluid to provide improved degradation of the filter cake and/or unbroken gel residue. As used herein "internal breaker" means an enzyme and/or non-enzyme polymer breaker mixed with or otherwise incorporated into a polymer-containing treatment fluid.

An enzyme pre-treatment fluid may also be introduced into a subterranean formation prior to introduction of a polymeric treatment fluid containing no enzyme breaker, in a similar manner contacting filter cake and/or unbroken gel residue from the reservoir or formation side, and sweeping the filter cake and/or gel residue as pressure is relieved with the recovery of the polymeric treatment fluid. As used herein, the terms "combining", "contacting", and "applying" include any methods suitable for admixing, exposing, or otherwise causing two or more materials, compounds, or components to come together in a manner sufficient to cause at least partial degradation, partial reaction, and/or at least partial mixing to occur between the components.

Although not wishing to be bound by theory, it is believed that benefits of the disclosed enzyme pre-treatment method are achieved through plating of the enzyme on the formation face and/or through leak-off of the enzyme pre-treatment fluid into the formation matrix (e.g, through pore throats, natural fractures, etc.), in either case placing the enzyme on the reservoir or formation side (behind) a subsequently-formed filter cake and/or unbroken gel residue which is deposited during a subsequent polymer treatment. In cases where employed enzymes are charged particulars (such as guar specific ENZYME G, from BJ Services), these enzymes have plating tendencies. It is believed that these enzymes tend to plate on the formation face before a filter cake is deposited from a subsequent polymer-containing treatment fluid. Additionally, it is believed that enzyme-containing fluid from the enzyme pre-treatment fluid may also leak off through the formation face into the reservoir. In either scenario, enzyme from the enzyme treatment fluid contacts filter cake and/or unbroken gel residue from a subsequently injected polymer-containing treatment fluid from the reservoir or formation side. Furthermore, in the case of hydraulic fracturing treatments, enzyme-enriched fluid tends to enter a fracture from the reservoir or formation side and sweep the fracture as the pressure is relieved with the recovery of the fracturing fluid, thus more effectively degrading deposited filter cake and other polymer residues. When an internal breaker (such as an enzyme and/or oxidative breaker) are employed in a fracturing fluid, retained conductivity of a fracture may therefore be maximized.

Advantageously, by employing a spacer (not containing enzyme) between an enzyme pre-treatment fluid and a polymer-containing fluid, stability of a polymer-containing treatment fluid may be further insured to be a function of the internal breaker system of the polymer-containing treatment fluid (or lack thereof). In addition, during treatments in which differential pressure exists between the wellbore and formation, this pressure tends to act to contain an enzyme pre-treatment solution within the formation. For example, during a fracture treatment, differential pressure between the fracture and the formation acts to substantially contain the enzyme pre-treatment solution behind the fracture, particularly in the presence of an energizing phase (such as nitrogen, $CO_2$, and/or liquefied petroleum gas), when employed. Advantageously, this containment tends to allow the viscosity decline profile of a polymer-containing fracture fluid to be substantially controlled by the internal breaker system employed in the polymer-containing treatment fluid.

In the practice of the disclosed method, an enzyme flush treatment may be employed as part of any well application in which polymer-containing well treatment fluids are introduced into a wellbore and/or subterranean formation. Examples of such well treatment applications include drilling, completion, remedial and workover applications. Specific examples of polymer-containing treatment fluids include, but are not limited to, drilling muds, drill-in fluids, sand control fluids, gravel pack fluids, gelled acid fluids, hydraulic fracturing fluids (with or without proppant), loss circulation fluids, viscous pills, etc.

In the practice of the disclosed method, an enzyme pre-flush or pre-treatment fluid may include any enzyme or combination of multiple enzymes suitable for degrading or otherwise reducing the viscosity of one or more polymers present in a polymer treatment fluid. In this regard, with benefit of this disclosure, any number of enzyme/polymer combinations known in the art may be employed in the practice of the disclosed method. Examples of suitable enzyme/polymer combinations include, but are not limited to, those enzymes and polymers described in U.S. Pat. No. 5,165,477; U.S. Pat. No. 5,201,370; U.S. Pat. No. 5,247,995; U.S. Pat. No. 5,562,160; and/or U.S. patent application Ser. No. 08/813,064 entitled "Methods and Materials for Degrading Xanthan" filed Mar. 7, 1997, each of which is incorporated herein by reference. Furthermore, although an enzyme pre-treatment fluid is typically formulated with an aqueous-based fluid, any other fluid (e.g, hydrocarbons, etc.) suitable for delivering an enzyme to a wellbore and/or subterranean formation may be employed including, but not limited to, oil-based, gas-mist, oil-energized, aqueous-energized, alcohol-based, etc. For example, a gas-mist enzyme treatment fluid may be formulated by introducing an enzyme/water mixture into an energizing phase flow line prior to introduction into a wellbore.

In the practice of the disclosed method, a polymer-containing treatment fluid is typically a gelatable fluid comprising an aqueous-based fluid and at least one hydratable polymer, although any type polymer-containing treatment fluid may be employed including, but not limited to, aqueous-energized, oil-based, and oil energized polymer-treatment fluids. In this regard, such treatment fluids may be formulated with benefit of this disclosure and using methods known to those of skill in the art.

A polymer treatment fluid may include any suitable polymer viscosifier or mixture of viscosifiers known in the art, including those identified elsewhere herein. Such polymers and polymer treatment fluids include, for example, those oil based fluids described in U.S. Pat. No. 3,710,865 and U.S. Pat. No. 4,442,897 which are incorporated herein by reference in their entirety. Most typically in the practice of the disclosed method, a gelatable fluid is formulated by combining or blending together an aqueous fluid, hydratable polymer, an optional cross-linking agent for cross-linking the hydratable polymer and/or an optional enzyme breaker. An aqueous fluid may be any aqueous fluid suitable for hydrating a hydratable polymer. Examples of suitable aqueous fluids include, but are not limited to, water, brine, aqueous-based foams, water-alcohol mixtures, KCl water, etc.

A hydratable polymer may be, for example, any hydratable polysaccharide or mixture of hydratable polysaccharides suitable for use in forming polymer-containing well treatment fluids. Such polysaccharides include those polysaccharides capable of forming linear or cross-linked gels. Examples of suitable hydratable polysaccharides include glactomannan gums, guars, derivatized guars, cellulose and cellulose derivatives, starch, starch derivatizes, xanthan, derivatized xanthan and mixtures thereof. Specific examples also include, but are not limited to, guar gum, guar gum derivative, locust bean gum, karaya gum, xanthan gum, cellulose and cellulose derivatives, etc. More typical polymers or gelling agents include guar gum, hydroxypropyl guar, carboxymethyl hydroxypropyl guar, hydroxyethyl cellulose, carboxymethyl hydroxyethyl cellulose, carboxymethyl cellulose, dialkyl carboxymethyl cellulose, etc. Other examples of polymers include, but are not limited to, phosphomannons, scerolglucons, dextrans and other types of polymers. In one most typical embodiment of the disclosed method, a polymer gelling agent is carboxymethyl hydroxypropyl guar is employed.

In addition to a polymer or mixture of polymers, a polymer-containing treatment fluid may also include an optional cross-linking agent. In this regard, any cross-linking agent suitable for cross-linking polymers may be employed in the practice of the disclosed method with benefit of this disclosure, including those cross-linking agents known in the well treating art. Examples of suitable cross-linking agents for use as hydratable polymers include, but are not limited to, metal ions such as aluminum, anomony, zirconium and titanium-containing compounds, including the so-called organotitinates. Examples of suitable cross-linkers may also be found in U.S. Pat. No. 5,201,370; U.S. Pat. No. 5,514,309, U.S. Pat. No. 5,247,995, U.S. Pat. No. 5,562,160, and U.S. patent application Ser. No. 08/813, 064 entitled "Methods and Materials for Degrading Xanthan" filed Mar. 7, 1997, which have been incorporated herein by reference. Typical cross-linkers and cross-linker solutions for guar based polymers include borate ion donating materials and methods for using such cross-linking materials are described, for example, in U.S. Pat. No. 5,082,579, U.S. Pat. No. 5,145,590, U.S. Pat. No. 5,160,643, U.S. Pat. No. 5,201,370, and U.S. Pat. No. 5,562,160, which are incorporated by reference herein in their entirety. Examples of borate-based crosslinkers include, but are not limited to, organo-borates, mono-borates, poly-borates, mineral borates, etc. Whether cross-linked or not, as used herein the terms "filter cake" and "gel residue" include cross-linked and non-cross-linked polysaccharides and/or other polymer materials.

In the practice of the disclosed method, a polymer-containing treatment fluid containing at least one polymer or a mixture of polymers as mentioned above may be employed, with or without cross-linker. In one embodiment, a polymer treatment fluid may be a guar or derivatized guar-based fracturing fluid. Typically, a derivatized guar-based polymer-containing treatment fluid is a based on carboxymethyl hydroxypropyl guar polymer. For example, in one embodiment, a 35 lb. gel of carboxymethyl hydroxypropyl guar polymer is employed with a zirconium-based cross-linker. Such a polymer treatment fluid is available as "MEDALLION 3500" or "MEDALLION 3500 LPH" (Low pH), both commercially available from BJ Services Company. Another exemplary embodiment of a suitable crosslinked CMHPG treatment fluid may be a 40 lb gel of carboxymethyl hydroxypropyl guar polymer known as "MEDALLION FRAC 4000 HT" (from BJ Services). It will be understood with benefit of this disclosure that the above fluids may be formulated without cross-linker as well.

Other examples of suitable polymer treatment fluids that may be employed in the practice of the disclosed method include, but are not limited to, "AQUA FRAC" (non cross-linked guar gelled water), "METHOFRAC" (methanol cross-linked HPG), "VIKING" (borate crosslinked guar), "VIKING D" (borate crosslinked guar), "SPECTRAFRAC G" (organo-borate crosslinked guar), "XL ACID II" (crosslinked hydrochloric acid-based acrylic polymer), and "POLY EMULSION" (oil and gelled water emulsion), "SUPER RHEO GEL" (cross linked gelled oil), all available from BJ Services.

In addition to at least one polymer material and an optional cross-linker, a polymer treatment fluid may include at least one breaker material. In this regard, any suitable breaker known in the well treating art may be employed in a polymer treatment fluid. Examples of suitable breaker materials include any of the enzymes disclosed herein or in the patents incorporated by reference herein, and/or one or more oxidative breakers known in the well treating industry. Specific examples of suitable oxidative breakers include but are not limited to encapsulated breakers, such as encapsulated potassium persulfate (such as ULTRAPERM CRB or SUPERULTRAPERM CRB, available from BJ Services). Other suitable breakers which may be employed in a polymer treatment fluid include, but are not limited to, conventional oxidative breakers, such as ammonium peroxydisulfate. Typically, such breakers are included in a polymer treatment fluid in a concentration of between about 0.1 lb/1000 gals. and about 10 lb/100 gals. Most typically a conventional oxidative breaker is employed with an enzyme pre-treatment fluid comprising a polymer specific enzyme.

In the practice of the disclosed method, any enzyme or mixture of enzymes suitable for degrading or otherwise reducing the viscosity of a polymer containing filter cake and/or gel residue may be employed in the formulation of an enzyme pre-treatment fluid. As previously mentioned, this includes enzymes such as those described in U.S. Pat. No. 5,165,477; U.S. Pat. No. 5,201,370; U.S. Pat. No. 5,247,995; and/or U.S. Pat. No. 5,562,160; and/or U.S. patent application Ser. No. 08/813,064 entitled "Methods and Materials for Degrading Xanthan" filed Mar. 7, 1997, which have been incorporated herein by reference. In this regard, to enzyme pre-treatment fluids may be tailored to particular polymer-containing treating fluids and/or to specific polymeric organic viscosifiers contained therein. Alternatively, an enzyme treatment fluid may be formulated for particular types or categories of polymer treatment fluids and/or specific polymeric organic viscosifiers common to such polymer treatment fluids. Although any suitable type of enzyme may be employed, most typical enzymes suitable in the practice of the disclosed method include hydrolases, lyases, transferases and oxidoreductases. More typically, hydrolases or lyases, and most typically hydrolases are employed.

Although any hydrolase suitable for degrading and/or otherwise reducing the viscosity of a particular polysaccharide or mixture of polysaccharides may be used, most typically the following categories of hydrolases are employed. For guar containing polymeric fluids, an enzyme treatment fluid typically includes hydrolase enzymes specific to attack mannosidic and galactomannosidic linkages in the guar residue, breaking the molecules into monosaccharide and disaccharide fragments. Under some conditions, these enzymes may hydrolyze the residue completely into monosaccharide fragments. In this regard, the most typical enzyme for guar containing filter cakes are galactomannan hydrolases collectively referred to as galactomannanases and which specifically hydrolyze $(1,6)$-$\alpha$-D-galactomannosidic and the $(1,4)\beta$-D-mannosidic linkages between the monosaccharide units in the guar backbone, respectively. Examples of galactomannanases include GAMMANASE 1.0 L (from Novo Nordisk of Denmark) and ENZYME G (from BJ Services). Another example is GAMMANASE 1.5 L (from Novo Nordisk of Denmark), and ENZYME G (from BJ Services).

In the practice of the disclosed method, any suitable concentration of galactomannanase may be employed, however, a most typical concentration of galactomannanase is a 1:2 (weight/weight [w/w]) solution of $(1,6)$-$\alpha$-D-galactosidase and mannan endo-$(1,4)$-$\beta$-D-mannanosidase, the galactomannanase being present in the range of from about 0.001 to about 0.004% by weight, based on the total weight of aqueous fluid. Further information on such enzymes may be found in U.S. Pat. No. 5,562,160; U.S. Pat. No. 5,201,370; U.S. Pat. No. 5,514,309; U.S. Pat. No. 5,247,995; and U.S. patent application Ser. No. 08/813,064 entitled "Methods and Materials for Degrading Xanthan" filed Mar. 7, 1997, which have been incorporated herein by reference.

In another embodiment, an enzyme pre-treatment fluid for use with a cellulose-containing or derivatized cellulose-containing polymer-containing treatment fluid typically includes specific enzymes to attack glucosidic linkages of the cellulose backbone. Typically these enzymes are any enzymes or combination of enzymes suitable for attacking the glucosidic linkages of a cellulose polymer backbone and of degrading the polymer into mostly monosaccharide units including, but not limited to, cellulase, nonspecific hemicellulases, glucosidase, endo-xylanase, exo-xylanase, etc. Two typical enzymes are commonly called exo- and endo-xylanases. The most typical enzymes for use with cellulose based polymer treatment fluids specifically hydrolyze the exo$(1,4)$-$\beta$-D-glucosidic and endo$(1,4)$-$\beta$-D-glucosidic linkages between monosaccharide units and the cellulose backbone in the $(1,4)$-$\beta$-D-glucosidic linkages of any cellobiose fragments. Examples of the most typical xylanases include, but are not limited to, "SP431" (from Novo Nordisk of Norway), and "ENZYME C" and "ENZYME CHT" ("GBW-13 and "GBW-26"), from BJ Services. In this regard, the most typical enzyme treatment fluid is a 1:4 (w/w) solution of exo$(1,4)$-$\beta$-D-xylanase and endo$(1,4)$-$\beta$-D-xylanase. The xylanases should be present in a range of from about 0.01% to about 10% by volume based on the total volume of aqueous fluid, most typically about 0.5%.

For use with starch containing treatment fluids, an enzyme treatment fluid including one or more enzymes is typically selected from one or more of endo-amylases, exo-amylases, isoamylases, glucosidases, $\alpha$-glucosidases, glucan $(1,4)$-$\alpha$-glucosidase, glucan $(1,6)$-$\alpha$-glucosidase, oligo-$(1,6)$-glucosidase, $\alpha$-glucosidase, $\alpha$-dextrin endo-$(1,6)$-$\alpha$-glucosidase, amylo-$(1,6)$-glucosidase, glucan-$(1,4)$-$\alpha$-maltotetrahydralase, glucan-$(1,6)$-$\alpha$-isomaltosidase, glucan-$(1,4)$-$\alpha$-maltohexaosidase, etc. The most typical endo-amylase is selected based on conditions present in the formation, such as pH and temperature. Various types of endo-amylases are well known in enzymology and are readily available from a wide variety of commercial vendors, such as Novo Nordisk. The amount of enzyme used in this embodiment is the same as discussed for the cellulose filter cake.

For use with xanthan-containing polymer treatment fluids, hydrolases which break down the 1,4-β-D-glucosidic linkages within a cellulose backbone are typically employed. Examples include one or more of the same enzymes described above for cellulose containing polymer treatment fluids and mannosidase or mannan (1,2)-β-D-mannosidase, although no particular enzymes or concentrations of enzyme are currently preferred. Although neutral or slightly acidic pH's are preferred in these cases, no pH is currently considered optimal. The pH depends on the activity range of the selected enzymes and the conditions found within the formation.

Propping agents which may be employed with polymer treatment fluids used for fracturing include any propping agent suitable for hydraulic fracturing known in the art. Examples include, but are not limited to, silica, quartz sand grains, glass and ceramic beads, walnut shell fragments, aluminum pellets, nylon pellets, resin-coated sand, synthetic organic particles, glass microspheres, sintered bauxite, mixtures thereof and the like. In this regard, propping agents are typically used in concentrations of between about 1 to about 18 pounds per gallon of fracturing fluid composition, but higher or lower concentrations may also be used as required. Furthermore, it will be understood with benefit of the present disclosure that an enzyme pre-treatment fluid may precede a polymer-containing treatment fracture fluid having no proppant. Furthermore, the base fluid may also contain other conventional additives common to the well service industry, such as surfactants, and the like.

In one specific exemplary embodiment of a typical fracturing operation, a polymer-containing treatment fluid is introduced into a wellbore in a subterranean formation at a rate sufficient to initiate and propagate a fracture in the formation and to place propping agents into the fracture, although it is not necessary that propping agents be employed. For example, a typical fracturing treatment may be performed by hydrating an about 0.24% to about 0.72% (weight/volume [w/w]) galactomannan based polymer, such as guar, in an about 2% (w/w) KCl solution at a pH ranging from about 3 to about 12. During pumping, pH may be adjusted by addition of a buffer, followed by addition of an enzyme breaker, cross-linking agent, proppant and other additives if required.

In the practice of the disclosed method, any volume of enzyme pre-treatment fluid relative to volume of polymer-containing treatment fluid may be employed, however, sufficient volume of enzyme pre-treatment fluid to saturate a subterranean formation in the immediate well-bore vicinity, or to saturate the formation at the wellbore formation face is typically employed. In one exemplary embodiment, typically a volume ratio of from about 0.5% to about 200% pre-treatment fluid based on volume of polymer-containing treatment fluid, more typically from about 1% to about 100% pre-treatment fluid based on volume of polymer-containing treatment fluid, even more typically from about 5% to about 50% treatment fluid based on volume of polymer-containing treatment fluid, and most typically about 10% treatment fluid based on volume of polymer-containing treatment fluid. In another exemplary embodiment, an enzyme pre-treatment fluid volume is typically from about 1% to about 100%, more typically from about 5% to about 50%, even more typically from about 10% to about 25%, and most typically about 10% of the overall volume of an entire treatment volume (including enzyme pre-treatment fluid, polymer-containing treatment fluid, pad, spacer, flush, etc.). Although the above exemplary volumes have been given, it will be understood with benefit of this disclosure that any amount of enzyme pre-treatment fluid may be employed including, but not limited to, amounts greater than or less than those ranges given in the above embodiments.

Although an enzyme pre-treatment fluid typically includes at least one enzyme for degrading or reducing the viscosity of at least one polymer component of a polymer-containing treatment fluid, more typically an enzyme treatment fluid includes one or more enzymes as necessary to degrade or reduce the viscosity of the majority of polymer materials that may be included in a specific polymer treatment fluid. Most typically, one or more enzymes specific to degrade linkages of specific polymers employed in a polymer treatment fluid are used as described elsewhere herein.

Although an enzyme pre-treatment fluid may be immediately preceded by a polymer-containing treatment fluid, typically a spacer or pad between the enzyme treatment fluid and the polymer treatment fluid is employed. Such a spacer or pad may be employed, for example, to clean up mixing and pumping equipment and/or to isolate a pre-treatment fluid from a polymer-containing treatment fluid. A spacer may include any fluid common to the oil treating industry, including aqueous-based fluids such as gelled water, fresh water, light brines, saturated brines, etc. Examples of other suitable spacers include, but are not limited to, oil or hydrocarbon-based fluids, gases, foams, mists, etc., although an aqueous fluid is typically employed. Examples of typical types of aqueous spacers include, but are not limited to, fresh water, sodium chloride brines, potassium chloride brines, and mixtures thereof. Furthermore, such a spacer may contain additives known in the art, including polymers. Most typically, a spacer of 2% KCl (not containing enzyme or polymer) is pumped between an enzyme pre-treatment fluid and polymer-containing treatment fluid. In this regard, the function of a spacer or pad during introduction of the fluids into a wellbore is to help isolate the polymer-containing treatment fluid from the enzymes in the enzyme pre-treatment fluid, thereby preventing premature breaking or degradation of the polymers in the polymer treatment fluid.

Although any volume of spacer suitable for separating a polymer-containing treatment fluid from an enzyme pre-treatment fluid, a spacer volume may be selected based on volume of fluid required to clean-up surface equipment (e.g., blender, lines, pumps, etc.) and wellbore tubulars. Exemplary volumes of spacer include, but are not limited to, from about 2 barrels ("bbls") to about 500 bbls, alternatively from about 12 bbls to about 120 bbls. Such spacer volumes may be determined, with benefit of this disclosure, using methods known in the well treating art, such as by using a spacer volume equivalent to about one wellbore tubular volume. For example, in one exemplary embodiment for treating a 7000 ft well through 5½" casing, a 5000 gallon enzyme pre-treatment fluid may be followed by a 2,000 gallon spacer pumped ahead of a polymer-containing treatment fluid.

In well stimulation treatment embodiments, a polymer-containing treatment fluid is typically followed by a flush stage to displace the treatment fluid into the formation. Volume and formulation of such flush stages are known in the art and, with benefit of this disclosure, may be practiced with the disclosed method. In this regard, a flush may be any suitable displacement fluid, such as one or more of those fluid types mentioned as suitable for use as spacer fluids.

In one exemplary embodiment of fracture stimulation treatment, an enzyme pre-treatment fluid containing ENZYME G at a ratio of from about 0.5 gallon ENZYME G concentrate to about 1000 gallons fresh water to about 10 gallons ENZYME G concentrate to about 1000 gallons fresh water, alternatively at a ratio of from about 0.5 gallon ENZYME G concentrate to about 1000 gallons fresh water to about 5 gallons ENZYME G concentrate to about 1000 gallons fresh water, and further alternatively at a ratio of about 2 gallons ENZYME G concentrate to about 1000 gallons fresh water is introduced into a wellbore. In this regard, such an enzyme pre-treatment fluid may be made up of, for example, a 2% KCl "prefrac pump-in" fluid (such as used to determine leak-off), and may contain GPT ENZYME G at the above described ratio. Total volume of fluid may be modified to accommodate the measure of Enzyme G solution desired. In one specific example, 1000 gallons of 2% KCl would include a total of 2 gallons ENZYME G concentrate to achieve a 1:500 ratio.

In this exemplary embodiment, a spacer of from about 50 to about 100 barrels of 2% KCl is typically introduced into the wellbore following the enzyme pre-treatment fluid. This is typically followed by a polymer-containing fracture treatment fluid comprising a CMHPG zirconium crosslinked fracture treatment fluid (available as "MEDALLION 3500, LPH" from BJ Services) which also contains internal breakers. In one embodiment the internal breakers include "ULTRAPERM CRB" oxidative breaker and "ENZYME G" (both available from BJ Services). In this regard, the "ULTRAPERM CRB" oxidative breaker may be present in the total fracture fluid in an amount of from about 1 pound per thousand gallons ("ppt") of fracture fluid to about 5 ppt, and the "ENZYME G" may be incorporated at a volume ratio (v/v) of "ENZYME G" to total fracture treatment fluid of from about 1:10 to about 1:10,000, more typically from about 1:10 to about 1:1000, even more typically from about 1:10 to about 1:500 and most typically about 1:500.

Advantageously, the breaker package employed in the polymer-containing treatment fluid allows for the design of a very specific viscosity decline profile at bottom hole temperature. For example, in one embodiment without a separate non-enzyme breaker and designed for a static bottom hole temperature of about 150° F., a viscosity decline profile may be provided which includes a viscosity retained at a time equal to the pump time, specific break times after pump time, and proppant suspension minimum or maximum time frames. In this embodiment, the viscosity decline specification is obtained by limiting the concentration of ENZYME G to about 1 gallon per 1,000 gallons ("GPT") of a solution containing about 1 gallon of ENZYME G concentration to about 1000 gallons of fresh water. Advantageously, by preceding the polymer-containing treatment fluid with an enzyme treatment fluid containing ENZYME G, sufficient breaking capacity may be provided while at the same allowing reduction in the concentration of breaker included within the polymer-containing treatment fluid itself. In this way, superior viscosity decline specification and superior breaking characteristics during treatment flowback may be achieved.

Although the preceding paragraph describes one typical embodiment of the disclosed method employing a polymer-containing fracture treatment fluid preceded by an enzyme pre-treatment fluid containing ENZYME G, it will be understood by those of skill in the art with benefit of this disclosure that characteristics, types and amounts of the individual components may be varied for individual well and formation conditions, and according to the characteristics of particular polymers and enzymes selected. For example, volumes of polymer-containing treatment fluid, breaker concentration in the polymer-containing treatment fluid, volume of enzyme treatment fluid and enzyme concentration therein, and spacer volume may be varied as so desired. In addition, the total volume of the enzyme pre-treatment fluid and/or the concentration of enzyme in the pre-treatment fluid may be modified as desired according to individual preference (costs, well conditions, etc.).

For example, enzyme concentration within an enzyme pre-treatment fluid may be in any amount suitable for supplementing breaking of a polymer treatment fluid during treatment flowback. In the case of embodiments employing "ENZYME G," typically a volume ratio (v/v) of from about 1:10 to about 1:10,000, more typically from about 1:10 to about 1:1000, even more typically from about 1:10 to about 1:500, and most typically about 1:500 volume of "ENZYME G" to total volume of enzyme pre-treatment fluid is employed. Similarly, within a polymer-containing treatment fluid, the concentration of internal enzyme breaker and/or other internal breakers may be varied or modified to achieve a synergistic effect with the enzyme treatment fluid. In this regard, in the above-mentioned exemplary embodiment, concentrations of oxidative breakers such as "ULTRAPERM CRB" may be varied or, for example, slower breaking "SUPERULTRAPERM CRB" may be employed in conjunction with higher concentrations of "ENZYME G" while maintaining the desired viscosity decline profile.

One embodiment of the disclosed method employs a polymer substrate in an enzyme pre-treatment fluid for more effective delivery of the enzyme to the formation (by for example, increasing fluid viscosity to help suspend and transport the enzyme more efficiently and/or to reduce fluid leak-off to the formation), and/or to achieve greater interaction with the polymer within the filter cake (such as within a fracture in the case of a fracture treatment). This may serve, for example, to increase formation exposure to an enzyme of a pre-treatment fluid, for example by further extending the reach of an enzyme treatment fluid into a formation. This may be the case, for example, where fluid leak-off is such that fracture extension by the pre-treatment fluid is limited. A polymer substrate may also aid in fixing a an enzyme to the formation face, pore network, or formation matrix during an ensuing well treatment. In a further embodiment, a foamed enzyme pre-treatment fluid containing a polymer substrate may be employed. In such an embodiment, foam viscosity may further prevent leak off into the formation and/or help transport enzyme further back into the formation.

In the practice of the disclosed method, a polymer substrate may be any polymer suitable for gelling (including forming linear or cross-linked gels) an enzyme pre-treatment fluid, such as those polymers described elsewhere herein. Such polymer substrates may be used in the formulation of, for example, gelled oil, gelled water, or terminal cross-linked enzyme pre-treatment fluids. Typically, a polymer substrate is selected to correspond to the enzyme/s of the pre-treatment fluid such that it is degraded by the enzyme/s, although this is not necessary. Furthermore, in addition or in the alternative, a separate internal breaker may be employed to degrade the polymer substrate, if so desired. When a polymer substrate is employed in an enzyme pre-treatment fluid, increased concentration of enzyme may be employed to facilitate breaking of the polymer substrate upon delivery to the formation.

Polymer types suitable for use as polymer substrates include, but are not limited to, any polymer viscosifier or mixture of polymers known in the art, such as those mentioned elsewhere herein for use in formulation of polymer-containing treatment fluids. Suitable polymer substrates include polysaccharides, synthetic polymers, or mixtures thereof. Examples of such polymers include, but are not limited to polysaccharides and/or acrylic polymers. Specific examples of galactomannans include, but are not limited to, CMHEC (carboxymethyl hydroxylethyl cellulose), HC (hydroxy cellulose), HEC (hydroxyethyl cellulose). Specific examples of polysaccharides include, but are not limited to, guar, CMC (carboxymethyl cellulose), CMG (carboxymethyl guar), CMHPG (carboxymethyl hydroxypropyl guar), HPG (hydroxypropyl guar), and xanthan. These polymers are available, for example, from BJ Services as "GW4" (guar), "GW21" (HEC), "GW22" (xanthan gum), "GW24L" (HEC slurry), "GW45" (CMG), "GW27" (guar), "GW28" (CMHEC), "GW32" (HPG), "GW38" (CMHPG) respectively. Slurried counterparts of these polymers are available from BJ Services as "XLFC1" (guar), "XLFC1B" (guar), "XLFC2" (HPG), "XLFC2B" (HPG), "XLFC3" (CMPHG) "XLFC3B" (CMHPG), "VSP1" (CMG), and "VSP2" (CMG), respectively. A typical polymer substrate is CMHPG.

It will also be understood with benefit of this disclosure that oil based gels may also be used as a base for an enzyme pre-treatment fluid including, for example, those oil gels described in U.S. Pat. No. 3,710,865 and U.S. Pat. No. 4,442,897 which have been incorporated by reference herein. One specific example of such a fluid is available as "SUPER RHEO GEL" from BJ Services, and is a cross-linked gelled oil.

With benefit of this disclosure, the amount of polymer substrate formulated in an enzyme pre-treatment fluid may be varied using methods known in the art to meet individual conditions and desired characteristics of the fluid. For example, in one embodiment employing "ENZYME G," a polymer substrate-containing pre-treatment fluid is typically formulated with a volume ratio (v/v) of from about 1:10 to about 1:10,000, more typically from about 1:10 to about 1:1000, even more typically from about 1:10 to about 1:500, and most typically about 1:500 volume of "ENZYME G" to total volume of a guar-based polymer substrate-containing pre-treatment fluid. Such a fluid may contain any concentration or amount of polymer material suitable for acting as a suspension agent or gelling an enzyme pre-treatment fluid. In one embodiment, such a fluid contains from about 5 pounds of polymer per thousand gallons ("ppt") of pre-treatment fluid to about 100 ppt, alternatively from about 15 ppt to about 50 ppt, and further alternatively from about 15 ppt to about 40 ppt. In one embodiment, a guar-based polymer may be employed, and may be CMHPG, as well as other suitable guar-based polymers and mixtures thereof. A polymer substrate-containing pre-treatment fluid may be formulated with benefit of this disclosure using any method known in the art suitable for formulating polymer treatment fluids, such as using those methods and equipment conventionally employed for batch or continuous mixing, hydrating and/or pumping fracturing and other treatment fluids.

In another embodiment of the disclosed method, the pH of an enzyme pre-treatment fluid may be modified so as to temporarily inactivate the particular enzyme/s present in the pre-treatment fluid (for example, above a pH of about 10 for ENZYME G). As described above, a polymer substrate, cross-linked or not, may optionally be used to facilitate exposure or extension of this fluid into the formation. Temporary inactivation of the enzyme serves to prevent premature breakage of such a polymer substrate to help ensure that the pretreatment fluid retains viscosity until placement in the formation. After absorption by or placement in the formation, pH of the fluid will tend to return to the active pH range of the enzyme (for example, depending on the formation characteristics, from about 4 to about 8, more typically from about 6.5 to about 7.5 for ENZYME G).

In a further embodiment of the disclosed method, an enzyme pretreatment fluid (and/or any accompanying fluid stage, such as a polymer-containing treatment fluid) may be employed with an energizing phase. Typical examples of such applications include foamed treatment fluids and gas-assisted (non-foamed, non-emulsified) treatment fluids. In this regard, foams or gas-assisted fluids may be formulated with any suitable energizing phase gases known in the art including, but not limited to, gases such as nitrogen, carbon dioxide, liquefied petroleum gases, and/or mixtures thereof. These gases are typically mixed with water in a suitable surfactant. Foams may be employed in many applications. For example, foams may be employed as part of a stimulation treatment, such as an acid or hydraulic fracture treatment. When employed as part of a stimulation treatment, foams may be used, for example, to build viscosity and/or to help increase well clean-up efficiency and decrease well clean-up time by expanding to provide energy or pressure to support well clean-up following treatment. Other uses for foams include as a relatively lightweight circulating fluid which may be employed, for example, to clean out wellbores penetrating formations having relatively low bottom hole pressures.

With benefit of this disclosure, foamed or gas-assisted pre-treatment fluids and/or accompanying fluid stages may be formulated using methods know in the well treating art. For example, should a foamed fluid be desired, an energizing phase component may be added to an enzyme pre-treatment fluid and/or gelled polymer-containing fluid process stream/s prior to introducing the fluid into a wellbore. If desired, a viscosified or gelled treatment fluid may be cross-linked using methods and cross-linker compounds known in the art. In addition, proppant material may be added to the viscosified or gel treatment fluid prior to addition of the energizing phase, to achieve a proppant laden fracturing treatment fluid.

In the practice of the disclosed method, an energizing phase may be employed to more effectively deliver an enzyme. For example, one or more of the enzymes described elsewhere herein may be formulated in a 2% KCl base and combined with an energizing phase and optional foamer for delivery to a subterranean formation. In such cases, any one or all of an enzyme pre-treatment fluid, spacer, and/or polymer-containing treatment fluid may contain an energizing phase. In one embodiment, an energizing phase is only contained in the enzyme treatment fluid.

In the practice of the disclosed method, any energizing phase component suitable for forming a foam or otherwise energized fluid may be employed including, but not limited to, gaseous materials such as carbon dioxide, nitrogen, liquefied petroleum gases (such as liquefied natural gas and liquefied petroleum gas, etc.), or a mixture thereof. In the case of those embodiments employing foam, a flow rate of energizing phase component sufficient to maintain a Mitchell foam quality of from about 5% to about 90%, more typically from about 10% to about 80%, and most typically from about 30% to about 70% is typically utilized. In this regard, foam quality may be adjusted by those of skill in the art with benefit of this disclosure to fit particular applications, such as by varying the amount of foamer or surfactant and/or energizing phase employed. As used herein, "foam quality" refers to the ratio of gaseous phase to the sum of gaseous and liquid phases.

Enzyme pretreatment fluids for use with gelled acidizing fluids and other viscosified polymer fluids for introduction into a wellbore and/or injection into a subterranean formation may be formulated and employed in a manner similar to the preceding exemplary embodiments (e.g., in a manner similar to that employed with hydraulic fracturing treatments). With benefit of this disclosure, enzyme pre-treatment fluids may be employed with any gelled acid system known in the art which includes an enzyme-degradable or breakable polymer material. Examples of typical gelled acid systems include, but are not limited to, systems comprising polysaccharides or hydratable carboxyl substituted polysaccharides such as guar gum, karaya gum, xanthan gum, carboxymethyl, hydroxyethyl cellulose ("CMHEC"), carboxymethyl hydroxypropyl guar ("CMHPG"), carboxyethyl hydroxypropyl guar ("CEHPG"), hydroxy ethyl cellulose ("HEC"), hydroxy propyl guar ("HPG"), carboxy methyl guar ("CMG"), mixtures thereof, etc. Typically, enzyme pre-treatment fluids for use with such polymers comprise those enzymes capable of degrading or breaking the particular polymer/s selected for use, such as those enzymes described elsewhere herein. Most typically, such acid systems comprise xanthan gum.

In other embodiments of the disclosed method, an enzyme pre-treatment fluid may be employed with other types of polymer-containing treatment fluids used in drilling, completion, workover and/or remedial operations. Examples of such applications include, but are not limited to, gravel pack fluids, gelled pills, clear fluids and lost circulation control fluids. In these cases, an enzyme pre-treatment fluid may be introduce in any manner, including circulated, spotted or injected into a wellbore and/or subterranean formation prior to introducing the polymer-containing treatment fluid into the wellbore and/or subterranean formation. In such cases, an enzyme treatment fluid is typically formulated in a manner and concentration as previously described based on the type/s of polymer in the polymer-containing treatment fluid. The enzyme pre-treatment fluid is then circulated, spotted or otherwise introduced into the wellbore in a manner so as to contact the subterranean formation. In this regard, the enzyme pre-treatment fluid may be maintained in a position opposite the subterranean formation for a period of time or may be circulated past the subterranean formation. As with most embodiments of the disclosed method, the polymer-containing treatment fluid may then immediately follow the enzyme pre-treatment fluid, or a spacer may be employed such as that described elsewhere herein.

In a further embodiment of the disclosed method, an enzyme pre-treatment fluid may be employed with drilling fluids including, but not limited to, drilling muds and drill-in fluids. Drill-in fluids (or "clean fluids") typically include, for example, low-residue producing polymers. Categories of drill-in fluids include sized salt, specially sized calcium carbonate, conventional calcium carbonate, mixed-metal hydroxide, and specially formulated oil-based and synthetic fluids. Drill-in fluids typically include, for example, viscosifying polymers (or combinations of these polymers) such as a biopolymer, biopolymer blends, derivatized starch, or derivatized cellulose. Examples of such systems include, but are not limited to, starch-based systems containing xanthan, cellulose-based systems containing xanthan, and mixed systems containing cellulose, xanthan and starch. Filter cakes are typically formed even when "clean" drill-in fluids are introduced into a well or subterranean formation.

When used with drilling fluids (such as drilling muds or drill-in fluids), benefits of an enzyme pre-treatment fluid may be realized during drilling operations by, for example, drilling a section of hole and spotting a suitable volume of enzyme pre-treatment fluid across the newly drilled section of hole prior to resuming drilling. Advantageously, the method of this embodiment exposes the newly drilled formation to enzyme material prior to the creation of a thick filter cake during drilling operations. This exposure results in plating and/or placement of enzyme on the reservoir or formation side of the drilling filter cake. After the well is cased, perforated, and put on natural or artificial lift production, the enzyme material will tend to be drawn into the wellbore, sweeping the filter cake from the reservoir side, further reducing filter cake damage and enhancing productivity and/or injectivity of the formation. To enhance effectiveness of such an enzyme pre-treatment, the method may further include spotting and squeezing the enzyme treatment fluid into the formation prior to resuming drilling. As in all embodiments of the disclosed method, enzymes for an enzyme treatment fluid may be selected to degrade or break particular polymer materials in polymer-containing treatment fluid as described elsewhere herein.

In an alternate embodiment, an oxidative breaker-containing pre-treatment fluid may be employed to enhance breaker activity on a polymer filter cake in a manner similar to that discussed elsewhere herein for an enzyme pre-treatment fluid. In this regard, an oxidative breaker-containing pre-treatment fluid may be employed prior to or in conjunction with the same types of treatment fluids as an enzyme-containing pre-treatment fluid, and may be formulated for use in similar ways (e.g., as a foamed pre-treatment fluid, polymer substrate-containing pre-treatment fluid, etc.).

As with enzymes, in one embodiment oxidizing breakers may be formulated in a pre-treatment fluid which, when pumped just prior to a polymer-containing treatment fluid, tends to place oxidizing breaker at the formation face or in the formation matrix behind the formation face. The oxidative breaker-containing fluid will then tend to be contained behind or at the formation face by differential pressure during the ensuing displacement of polymer-containing fluids or other fluids into the wellbore and/or formation. Following treatment, oxidizing breaker is then in a position to contact and enhance degradation of any polymer-containing filter cake or other polymer-containing solids from the formation side.

With benefit of this disclosure it will be understood that any oxidative or oxidizing material or breaker known in the art that is suitable for degrading polymer-containing filter cakes or other solids may be employed in a pre-treatment fluid. Examples of suitable types of oxidizing breakers include, but are not limited to, ammonium persulfate, encapsulated ammonium persulfate, potassium persulfate, encapsulated potassium persulfate, inorganic peroxides, encapsulated inorganic peroxides, organic peroxides, encapsulated organic peroxides, sodium perborate, encapsulated sodium perborate. Specific examples of suitable oxidizing materials include, but are not limited to, breakers available from BJ Services as "GBW5" (ammonium persulfate), "GBW7" (sodium perborate), "GBW23" (magnesium peroxide), "GBW24" (calcium peroxide), "GBW36" (encapsulated potassium persulfate), "HIGH PERM CRB" (encapsulated potassium persulfate), "HIGH PERM CRB LT" (encapsulated persulfate), "ULTRA PERM CRB" (encapsulated potassium persulfate), "SUPER ULTRA PERM CRB" (encapsulated potassium persulfate), and "TRIGINOX" (organic peroxide).

Any amount or concentration of oxidizing breaker or mixture of such breakers suitable for degrading polymer-containing filter cake or other solids may be employed in a pre-treatment fluid. In one embodiment, concentration of anhydrous oxidizing breaker in a pre-treatment fluid may be from about 2 pounds per thousand gallons ("ppt") of pre-treatment fluid to about 200 ppt of pre-treatment fluid, alternatively from about 10 ppt to about 50 ppt. In another embodiment, concentration of liquid oxidizing breaker in a pre-treatment fluid is from about 2 gallons per thousand gallons ("GPT") to about 200 GPT of pre-treatment fluid, alternatively from about 5 GPT to about 20 GPT of pre-treatment fluid. However, with benefit of this disclosure it will be understood that oxidizing breaker concentration may be dependent on, among other things, concentration of active oxidizing breaker contained in a liquid oxidizer.

An oxidizing breaker-containing pre-treatment fluid may be formulated and introduced in conjunction with a well treatment in the same ways as described for enzyme-containing pre-treatment fluids. This includes introduction just prior to a polymer-containing treatment fluid, or with an optional spacer between the pre-treatment fluid and the polymer-containing fluid, as previously described. With benefit of this disclosure it will be understood that such a spacer may also include lower or more conventional concentrations of breakers, such as those typically employed in the art in the formulation of polymer gels for well treatment fluids. Thus, as an alternative to formulation of a separate spacer fluid, gelled water already on location may be employed as a spacer, if so desired.

In a manner similar to that described for enzyme-containing pre-treatment fluids, an oxidizing breaker-containing pre-treatment fluid may include the same optional polymer substrates as mentioned for use with enzyme-containing pre-treatment fluids. This substrates may be employed in the same way and same concentrations as previously mentioned for enzyme-containing pre-treatment fluids. Furthermore pre-treatment fluids containing both enzymes and oxidative breakers are also possible. In one embodiment, a mixture of "GBW-5" ammonium persulfate oxidative breaker and "ENZYME G" enzyme breaker is employed. In this embodiment, concentrations of oxidative breaker and enzyme breaker may be the same as that described elsewhere herein for each of these respective components when they are employed alone in a pre-treatment fluid. For example, to formulate a pre-treatment fluid comprising a mixture of oxidative and enzyme breakers, "GBW-5" may be employed in the pre-treatment in an amount of from about 2 GPT to about 200 GPT, and "ENZYME G" concentrate may be employed the same pre-treatment fluid in an amount of from about 0.5 GPT to about 10 GPT. However, other types and concentrations of enzyme and oxidative breakers may be employed, as may more than one enzyme and/or oxidative breaker in the formulation of a pre-treatment fluid.

Although particular exemplary embodiments of the disclosed method have been described herein, it will be understood with the benefit of this disclosure that benefits of the disclosed enzyme pre-treatment methods may be realized using any number or combination of enzymes and/or polymeric materials. Moreover, one or more enzyme pretreatment fluids may be introduced or otherwise utilized with one or more polymer treatment fluids and/or spacer fluids. For example, an enzyme pre-treatment fluid may be introduced into a wellbore following introduction of a first polymer treatment fluid but prior to introduction of a second polymer treatment fluid. Furthermore, multiple enzyme pre-treatment fluids may be used. For example, a first enzyme pre-treatment fluid may precede a first polymer treatment fluid, followed by a second enzyme pretreatment fluid preceding a second polymer treatment fluid. In any case, one or more spacers may be employed between any given enzyme pre-treatment fluid and/or polymer treatment fluid. Furthermore, multiple enzyme pre-treatment fluids may be utilized together. For example, a first enzyme pre-treatment fluid comprising one or more first enzymes may be followed by a second enzyme pre-treatment fluid comprising one or more second enzymes, the two enzyme pre-treatment fluids being separated by a spacer if so desired. In other cases, separate stages including the same enzyme pre-treatment fluid may be applied back-to-back with a spacer separating the stages. In still other cases, multiple fluid stages of different polymer treatment fluids and/or multiple enzyme pre-treatment fluids of varying enzyme type and/or concentration may be pumped separately and/or in any combination so desired. It will also be understood with benefit of this disclosure that the disclosed method may be employed using techniques known in the well treatment art, for example, with diversion agents.

EXAMPLES

The following examples are illustrative and should not be construed as limiting the scope of the invention or claims thereof.

Example 1

Example 1 represents just one example of a hydraulic fracturing treatment design employing a 50 Mitchell Quality foamed enzyme pre-treatment fluid according to one embodiment of the disclosed method. Tables 1–4 provide fracture treatment procedure and treatment schedule information for this example fracture treatment design.

A. Well Data for Example 1:

| | |
|---|---|
| Casing Size | 4 ½" |
| Fracture Gradient | 0.50 psi/ft |
| Bottom Hole Frac Pressure | 7,436 psi |
| Bottom Hole Temperature | 182° F. |
| Number of Perforations | 40 |
| Depth to Middle Perforation | 9,295 ft |

B. Foamed Enzyme Pre-Treatment Fluid Design

To formulate 10,000 gallons of enzyme pre-treatment fluid to be foamed with $CO_2$ prior to pumping downhole, 5,000 gallons of fresh water, containing 167 pounds of KCl per 1000 gallons of fresh water, is combined with "ENZYME G" at a concentration of 10 gallons of "ENZYME G" per 1000 gallons of fresh water.

C. Spacer Fluid Design

To formulate 10,000 gallons of spacer fluid to be foamed with $CO_2$ prior to pumping downhole, 5,000 gallons fresh water is combined with 167 pounds KCl per 1000 gallons of fresh water.

D. Fracture Treatment Fluid Design

To formulate 50,000 gallons of fracture treatment fluid to be foamed with $CO_2$ prior to pumping downhole, 25,000 gallons of "MEDALLION 4000" polymer treatment fluid is combined with the following components. The amounts given for each component are expressed in terms of component amount per 1000 gallons of polymer treatment fluid:

0.30 Pounds "XCIDE-207", isotiozolin bacteriacide 167.00 Pounds KCl 10.00 Gallons "XLFC-3B", slurried CMHPG diesel-based gelling agent (containing polymer at a concentration of 4lbs/gallon)

2.00 Gallons surfactant or surface tension reducer 5.00 Gallons "FAW-18W", surfactant foaming agent 1.20 Gallons "BF-10L", potassium carbonate buffering agent 1.00 Gallons "XLW-60", zirconium-based crosslinker 2.00 Pounds "SUPER PERM CRB" encapsulated oxidative gel breaker 0.50 Gallons "ENZYME G" enzyme breaker (1:500 v/v dilution)

0.50 Pounds "GBW-5" oxidative ammonium persulfate oxidative breaker (Last 4,000 Gallons of Mixed Volume.)

Total Proppant employed is 98,000 lbs of "PR-BLACK" 20/40 mesh resin coated sand E. Flush Fluid Design To formulate 5900 gallons of flush fluid to be foamed with $CO_2$ prior to pumping downhole, 2950 gallons of linear gel polymer treatment fluid is combined with the following components. The amounts given for each component are expressed in terms of component amount per 1000 gallons of polymer treatment fluid:

0.30 Pounds "XCIDE-207" isotiozolin bacteriacide 167.00 Pounds KCl 10.00 Gallons "LFC-3B" slurried CMHPG diesel-based gelling agent (containing polymer at a concentration of 4lbs/gallon)

2.00 Gallons surfactant or surface tension reducer 0.50 Gallons "ENZYME G" enzyme breaker (1:500 v/v dilution)

TABLE 1

$CO_2$ Commingled Frac Procedure -For Carbonated Fluids (Fluid Volumes)

| STAGE | FLUID TYPE | DOWN HOLE RATE (BPM) | TOTAL FLUID (Slurry) GALS | BBL | GEL VOLUME GALS | BBL |
|---|---|---|---|---|---|---|
| 1 | $CO_2$/enzyme pre-treat | 35.0 | 10000 | 238.1 | 5000 | 119.0 |
| 2 | spacer | 35.0 | 10000 | 238.1 | 5000 | 119.0 |
| 3 | $CO_2$/"Medallion" | 35.0 | 18000 | 428.6 | 9000 | 214.3 |
| 4 | $CO_2$/"Medallion" | 35.0 | 6284 | 149.6 | 3000 | 71.4 |
| 5 | $CO_2$/"Medallion" | 35.0 | 6569 | 156.4 | 3000 | 71.4 |
| 6 | $CO_2$/"Medallion" | 35.0 | 6853 | 163.2 | 3000 | 71.4 |
| 7 | $CO_2$/"Medallion" | 35.0 | 9517 | 226.6 | 4000 | 95.2 |
| 8 | $CO_2$/"Medallion" | 35.0 | 7422 | 176.7 | 3000 | 71.4 |
| FLUSH | $CO_2$/gel | 35.0 | 6065 | 144.4 | 3033 | 72.2 |
| | TOTALS | | 80710 | 1921.7 | 38033 | 905.5 |

TABLE 2

$CO_2$ Commingled Frac Procedure -For Carbonated Fluids (Proppant and $CO_2$ Rates)

| Stage | Concentration (Lb/Gal) | Mesh Size | Proppant | | | $CO_2$ Concentration (Scf/bbl) |
|---|---|---|---|---|---|---|
| 1 | 0.00 | 0 | 0 | 0 | 0 | 2924 |
| 2 | 0.00 | 0 | 0 | 0 | 0 | 2924 |
| 3 | 0.00 | 0 | 0 | 0 | 0 | 2935 |
| 4 | 1.00 | 20/40 | "PR-BLACK" | 6000 | 6000 | 2936 |
| 5 | 2.00 | 20/40 | "PR-BLACK" | 12000 | 18000 | 2936 |
| 6 | 3.00 | 20/40 | "PR-BLACK" | 18000 | 36000 | 2936 |
| 7 | 4.00 | 20/40 | "PR-BLACK" | 32000 | 68000 | 2936 |
| 8 | 5.00 | 20/40 | "PR-BLACK" | 30000 | 98000 | 2936 |
| FLUSH | 0.00 | 0 | 0 | 98000 98000 | 98000 98000 | 2937 |

Total $CO_2$ Required: 298.5 Estimated Tons (Includes 20.0 tons for Cooldown and Reserve)

TABLE 3

Treating Schedule

| | PROPPANT CONC. (lb/gal) | | | | | |
|---|---|---|---|---|---|---|
| STAGE | Perforations (includes gas) | Blender (liquid only) | INJECTION RATE (BPM) ($CO_2$) | (Gel) | SLURRY VOLUME (WITHOUT $CO_2$) (Slurry) (BBL) | (Cumulative) |
| 1 | 0.0 | 0.0 | 14.7 | 17.5 | 17.5 | 119.0 | 119.0 |
| 2 | 0.0 | 0.0 | 14.7 | 17.5 | 17.5 | 119.0 | 238.1 |
| 3 | 0.0 | 0.0 | 15.3 | 17.5 | 17.5 | 143.0 | 452.4 |
| 4 | 1.0 | 2.0 | 14.7 | 16.7 | 18.3 | 78.2 | 530.6 |
| 5 | 2.0 | 4.0 | 14.1 | 16.2 | 19.0 | 85.0 | 615.6 |
| 6 | 3.0 | 6.0 | 13.6 | 15.3 | 19.7 | 91.7 | 707.3 |
| 7 | 4.0 | 8.0 | 13.1 | 14.7 | 20.3 | 131.3 | 838.6 |
| 8 | 5.0 | 10.0 | 12.6 | 14.1 | 20.9 | 105.3 | 943.9 |
| Flush | 0.00 | 0.0 | 15.4 | 17.5 | 17.5 | 72.6 | 1016.1 |

TABLE 4

Treating Schedule ($CO_2$ Volumes)

| STAGE | $CO_2$ VOLUME (BBL) | (Cumulative) | PUMP TIME Hour:Minutes:Seconds |
|---|---|---|---|
| 1 | 99.8 | 99.8 | 6:48 |
| 2 | 99.8 | 199.5 | 6:48 |
| 3 | 15.7 | 386.6 | 12:14 |
| 4 | 62.7 | 449.2 | 4:16 |
| 5 | 63.0 | 512.2 | 4:28 |
| 6 | 63.3 | 575.4 | 4:39 |
| 7 | 84.7 | 660.1 | 6:28 |
| 8 | 63.8 | 723.9 | 5:02 |
| Flush | 63.3 | 787.3 | 4:07 |
| TOTAL PUMP TIME | | | 54:54 |

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or dependently. Thus the invention is not limited to only those combinations shown herein, but may include other combinations.

What is claimed is:

1. A method for treating a subterranean formation, comprising:
    introducing a pre-treatment fluid into said subterranean formation, said pre-treatment fluid comprising at least one breaker;
    then introducing a polymer-containing treatment fluid comprising at least one polymer into said subterranean formation; and
    then removing fluid from said subterranean formation;
    wherein said breaker contacts said polymer as fluid is removed from said subterranean formation; and wherein said breaker is effective to degrade and remove said polymer as said fluid is removed from said subterranean formation.

2. The method of claim 1, wherein said pre-treatment fluid comprises at least one enzyme.

3. The method of claim 2, wherein said polymer is guar, derivatized guar, or a mixture thereof.

4. The method of claim 2, wherein said polymer-containing treatment fluid is a gelatable fracturing fluid, gelatable acidizing fluid, or a mixture thereof.

5. The method of claim 2, wherein said polymer-containing treatment fluid is a gelatable fracturing fluid.

6. The method of claim 2, wherein said enzyme pre-treatment fluid further comprises a polymer substrate.

7. The method of claim 2, wherein said polymer-containing treatment fluid further comprises at least one enzyme, oxidative breaker, or mixture thereof that is effective to degrade said polymer within said polymer-containing treatment fluid.

8. The method of claim 1, wherein said pre-treatment fluid further comprises an energizing phase.

9. The method of claim 8, wherein said pre-treatment fluid comprises at least one enzyme.

10. The method of claim 1, wherein said pre-treatment fluid comprises at least one oxidative breaker.

11. The method of claim 10, wherein said oxidative breaker comprises at least one of ammonium persulfate, encapsulated ammonium persulfate, potassium persulfate, encapsulated potassium persulfate, inorganic peroxides, encapsulated inorganic peroxide, organic peroxides, encapsulated organic peroxide, sodium perborate, encapsulated sodium perborate, or a mixture thereof.

12. The method of claim 10, wherein said pre-treatment fluid comprises an encapsulated oxidative breaker.

13. The method of claim 12, wherein said encapsulated oxidative breaker is at least one of encapsulated ammonium persulfate, encapsulated potassium persulfate, encapsulated inorganic peroxide, encapsulated organic peroxide, encapsulated sodium perborate, or a mixture thereof.

14. The method of claim 1, wherein said pre-treatment fluid comprises a mixture of at least one oxidative breaker and at least one enzyme.

15. The method of claim 14, wherein said polymer comprises guar, derivatized guar or a mixture thereof, and wherein said pre-treatment fluid comprises ammonium persulfate oxidative breaker and guar specific enzyme.

16. A method of fracturing a subterranean formation, comprising:
    introducing a pre-treatment fluid into said subterranean formation, said pre-treatment fluid comprising at least one enzyme breaker, at least one oxidative breaker, or a mixture thereof;
    then introducing a polymer-containing treatment fluid comprising at least one polymer into said subterranean formation at a pressure sufficient to induce a fracture in said formation; and
    then removing fluid from said subterranean formation;
    wherein said enzyme or oxidative breaker contacts said polymer as fluid is removed from said subterranean formation; and wherein said enzyme or oxidative breaker is effective to degrade and remove said polymer as said fluid is removed from said subterranean formation.

17. The method of claim 16, wherein said polymer-containing treatment fluid is a gelatable fracturing fluid comprising a proppant; wherein said proppant is deposited in said fracture during said step of introducing said polymer-containing treatment fluid into said subterranean formation to maintain said fracture; and wherein said enzyme or oxidative breaker of said pre-treatment fluid enters said fracture from said subterranean formation as said fluid is removed from said subterranean formation.

18. The method of claim 17, wherein said pre-treatment fluid comprises at least one enzyme.

19. The method of claim 18, wherein said polymer-containing treatment fluid is a gelatable fluid comprising an aqueous fluid and at least one hydratable polymer.

20. The method of claim 19, wherein said gelatable fluid further comprises at least one crosslinking agent effective to cross-link said hydratable polymer.

21. The method of claim 19, wherein said hydratable polymer is a polysaccharide and said enzyme is a hydrolase.

22. The method of claim 21, wherein said polysaccharide is at least one of guar, derivatized guar, cellulose, derivatized cellulose, starch, derivatized starch, xanthan, derivatized xanthan, or a mixture thereof; and wherein said enzyme is at least one of hemicellulase, cellulase, amylase and xanthanase, or a mixture thereof.

23. The method of claim 22, wherein said polysaccharide is guar, derivatized guar, or a mixture thereof; and wherein said enzyme is hemicellulase.

24. The method of claim 18, wherein said enzyme pre-treatment fluid further comprises a polymer substrate.

25. The method of claim 24, wherein said enzyme pre-treatment fluid contains from about 5 pounds of said polymer substrate per thousand gallons of said enzyme pre-treatment fluid to about 100 pounds of said polymer substrate per thousand gallons of said enzyme pre-treatment fluid.

26. The method of claim 16, wherein said pre-treatment fluid comprises at least one enzyme; wherein said polymer-containing treatment fluid is a gelatable fluid comprising an aqueous fluid and at least one hydratable polymer and is a gelatable fracturing fluid, gelatable acidizing fluid, or a mixture thereof.

27. The method of claim 26, wherein said polymer-containing treatment fluid is a gelatable fracturing fluid.

28. The method of claim 16, wherein said polymer-containing treatment fluid further comprises at least one enzyme effective to degrade said polymer within said polymer-containing treatment fluid.

29. The method of claim 16, further comprising introducing a spacer fluid into said subterranean formation after introducing said pre-treatment fluid and before introducing said polymer-containing treatment fluid.

30. The method of claim 16, wherein said pre-treatment fluid further comprises an energizing phase.

31. A method of treating a subterranean formation, comprising:
  introducing an enzyme pre-treatment fluid into said subterranean formation, said enzyme treatment comprising an aqueous fluid and at least one enzyme;
  then introducing a polymer-containing treatment fluid into said subterranean formation, said polymer-containing treatment fluid comprising an aqueous fluid and at least one polymer into said subterranean formation; and
  then removing fluid from said subterranean formation;
  wherein said polymer-containing treatment fluid forms a filter cake or gel residue within said subterranean formations; wherein said enzyme contacts said filter cake or gel residue from a formation side of said filter cake or gel residue as fluid is removed from said subterranean formation; and wherein said enzyme is effective to degrade and remove said filter cake or gel residue as said fluid is removed from said subterranean formation.

32. The method of claim 31, wherein said polymer-containing treatment fluid is a gelatable fluid comprising an aqueous fluid and at least one hydratable polymer.

33. The method of claim 32, wherein said gelatable fluid further comprises at least one crosslinking agent effective to crosslink said hydratable polymer.

34. The method of claim 32, wherein said hydratable polymer is a polysaccharide and said enzyme is a hydrolase.

35. The method of claim 34, wherein said polysaccharide is at least one of guar, derivatized guar, cellulose, derivatized cellulose, starch, derivatized starch, xanthan, derivatized xanthan, or a mixture thereof; and wherein said enzyme is at least one of hydrolase, or a mixture thereof.

36. The method of claim 35, wherein said polysaccharide is guar, derivatized guar, or a mixture thereof; and wherein said enzyme is hydrolase.

37. The method of claim 32, wherein said polymer-containing treatment fluid is a gelatable fracturing fluid, gelatable acidizing fluid, or a mixture thereof.

38. The method of claim 32, wherein said polymer-containing treatment fluid is a gelatable fracturing fluid comprising a proppant; wherein a fracture is induced in said subterranean formation during said step of introducing said polymer-containing treatment fluid into said subterranean formation; wherein said proppant is deposited in said fracture during said step of introducing said polymer-containing treatment fluid into said subterranean formation to maintain said fracture; and wherein said enzyme of said enzyme pre-treatment fluid enters said fracture from said subterranean formation as said fluid is removed from said subterranean formation.

39. The method of claim 31, wherein said enzyme pre-treatment fluid further comprises a polymer substrate.

40. The method of claim 31, wherein said polymer-containing treatment fluid further comprises at least one enzyme effective to degrade said polymer within said polymer-containing treatment fluid.

41. The method of claim 31, further comprising introducing a spacer fluid into said subterranean formation after introducing said enzyme pre-treatment fluid and before introducing said polymer-containing treatment fluid.

42. The method of claim 31, wherein said enzyme pre-treatment fluid further comprises an energizing phase.

43. The method of claim 42, wherein said energizing phase is carbon dioxide, nitrogen, or a mixture thereof.

44. The method of claim 31, wherein a volume of said enzyme pre-treatment fluid is from about 5% to about 50% of a volume of said polymer-containing treatment fluid.

\* \* \* \* \*